United States Patent
Liu et al.

(10) Patent No.: US 11,842,271 B2
(45) Date of Patent: Dec. 12, 2023

(54) MULTI-SCALE MULTI-GRANULARITY SPATIAL-TEMPORAL TRAFFIC VOLUME PREDICTION

(71) Applicant: NEC Laboratories America, Inc., Princeton, NJ (US)

(72) Inventors: Yanchi Liu, Monmouth Junction, NJ (US); Wei Cheng, Princeton Junction, NJ (US); Bo Zong, West Windsor, NJ (US); LuAn Tang, Pennington, NJ (US); Haifeng Chen, West Windsor, NJ (US); Denghui Zhang, Urbana, IL (US)

(73) Assignee: NEC Corporation, Tokyo (JP)

( * ) Notice: Subject to any disclaimer, the term of this patent is extended or adjusted under 35 U.S.C. 154(b) by 713 days.

(21) Appl. No.: 17/003,112

(22) Filed: Aug. 26, 2020

(65) Prior Publication Data

US 2021/0064999 A1 Mar. 4, 2021

Related U.S. Application Data

(60) Provisional application No. 62/895,711, filed on Sep. 4, 2019, provisional application No. 62/893,221, filed on Aug. 29, 2019.

(51) Int. Cl.
*G06N 3/04* (2023.01)
*G06N 3/08* (2023.01)
*G06N 3/049* (2023.01)

(52) U.S. Cl.
CPC .............. *G06N 3/08* (2013.01); *G06N 3/049* (2013.01)

(58) Field of Classification Search
CPC .......................................................... G06N 3/08
See application file for complete search history.

(56) References Cited

U.S. PATENT DOCUMENTS

| | | | |
|---|---|---|---|
| 2015/0289146 A1* | 10/2015 | Ouyang | ................ H04L 47/127 370/252 |
| 2017/0220939 A1* | 8/2017 | Bansal | ..................... G06N 5/04 |
| 2020/0120131 A1* | 4/2020 | Soni | ....................... G06N 20/00 |

OTHER PUBLICATIONS

Rizwan, Ali, et al. "Mobile internet activity estimation and analysis at high granularity: Svr model approach." 2018 IEEE 29th Annual International Symposium on Personal, Indoor and Mobile Radio Communications (PIMRC). IEEE, 2018. (Year: 2018).*

(Continued)

*Primary Examiner* — Hal Schnee
(74) *Attorney, Agent, or Firm* — Joseph Kolodka (57) ABSTRACT

Methods and systems for allocating network resources responsive to network traffic include modeling spatial correlations between fine spatial granularity traffic and coarse spatial granularity traffic for different sites and regions to determine spatial feature vectors for one or more sites in a network. Temporal correlations at a fine spatial granularity are modeled across multiple temporal scales, based on the spatial feature vectors. Temporal correlations at a coarse spatial granularity are modeled across multiple temporal scales, based on the spatial feature vectors. A traffic flow prediction is determined for the one or more sites in the network, based on the temporal correlations at the fine spatial granularity and the temporal correlations at the coarse spatial granularity. Network resources are provisioned at the one or more sites in accordance with the traffic flow prediction.

10 Claims, 7 Drawing Sheets

(56) References Cited

OTHER PUBLICATIONS

Yao, Huaxiu, et al. "Modeling spatial-temporal dynamics for traffic prediction." arXiv preprint arXiv:1803.01254 1 (2018): 9. (Year: 2018).*

Shi et al., "Convolutional LSTM Network: a Machine Learning Approach for Precipitation Nowcasting", Advances in Neural Information Processing Systems. (NIPS 2015). Dec. 7-12, 2015. pp. 802-810.

Tong et al., "The Simpler the Beler: a Unified Approach to Predicting Original Taxi Demands based on Large-Scale Online Platforms", Proceedings of the 23rd ACM SIGKDD International Conference on Knowledge Discovery and Data Mining. Aug. 13-17, 2017. pp. 1653-1662.

Yao et al., "Deep Multi-View Spatial-Temporal Network for Taxi Demand Prediction", Thirty-Second AAAI Conference on Artificial Intelligence. Feb. 2-7, 2018. pp. 1-8.

Yao et al., "Revisiting Spatial-Temporal Similarity: a Deep Learning Framework for Traffic Prediction", The Thirty-Third AAAI Conference on Artificial Intelligence. Jan. 27-Feb. 1, 2019. pp. 5668-5675.

Zhang et al., "Deep Spatio-Temporal Residual Networks for City-wide Crowd Flows Prediction", Thirty-First AAAI Conference on Artificial Intelligence. Feb. 4-9, 2017. pp. 1-7.

\* cited by examiner

FIG. 7

MULTI-SCALE MULTI-GRANULARITY SPATIAL-TEMPORAL TRAFFIC VOLUME PREDICTION

RELATED APPLICATION INFORMATION

This application claims priority to U.S. Application Ser. No. 62/893,221, filed on Aug. 29, 2019, and to U.S. Application Ser. No. 62/895,711, filed on Sep. 4, 2019, incorporated herein by reference herein their entirety.

BACKGROUND

Technical Field

The present invention relates to traffic volume forecasting, and, more particularly, to multi-scale determinations of traffic volume at the region-level and the site-level.

Description of the Related Art

Traffic volume prediction is used in a variety of applications to help manage resources and to predict and mitigate traffic congestion. Predicting traffic volume in a fine-grained manner, for example in a small geographical region, is challenging, due to the relatively high volatility of smaller regions.

SUMMARY

A method for allocating network resources responsive to network traffic includes modeling spatial correlations between fine spatial granularity traffic and coarse spatial granularity traffic for different sites and regions to determine spatial feature vectors for one or more sites in a network, using a processor-implemented neural network. Temporal correlations at a fine spatial granularity are modeled across multiple temporal scales, based on the spatial feature vectors. Temporal correlations at a coarse spatial granularity are modeled across multiple temporal scales, based on the spatial feature vectors. A traffic flow prediction is determined for the one or more sites in the network, based on the temporal correlations at the fine spatial granularity and the temporal correlations at the coarse spatial granularity. Network resources are provisioned at the one or more sites in accordance with the traffic flow prediction.

A method for allocating resources responsive to site-level traffic includes modeling spatial correlations between fine spatial granularity traffic and coarse spatial granularity traffic for different sites and regions to determine spatial feature vectors for one or more sites, using a processor-implemented neural network. Temporal correlations are modeled at a fine spatial granularity across multiple temporal scales, based on the spatial feature vectors. Temporal correlations are modeled at a coarse spatial granularity across multiple temporal scales, based on the spatial feature vectors. A traffic flow prediction is determined for the one or more sites in the network, based on the temporal correlations at the fine spatial granularity and the temporal correlations at the coarse spatial granularity. Resources are provided at the one or more sites in accordance with the traffic flow prediction.

A system for allocating network resources responsive to network traffic includes a processor-implemented spatial modeling network, configured to model spatial correlations between fine spatial granularity traffic and coarse spatial granularity traffic for a plurality of different sites and regions to determine spatial feature vectors for one or more sites in a network. A first temporal modeling network is configured to model temporal correlations at a fine spatial granularity across multiple temporal scales, based on the spatial feature vectors. A second temporal modeling network is configured to model temporal correlations at a coarse spatial granularity across multiple temporal scales, based on the spatial feature vectors. A fusion encoder is configured to determine a traffic flow prediction for the one or more sites in the network, based on the temporal correlations at the fine spatial granularity and the temporal correlations at the coarse spatial granularity. A resource allocator is configured to provision network resources at the one or more sites in accordance with the traffic flow prediction.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Embodiments of the present invention provides a multi-granularity, multi-graph convolution system to model different types of non-Euclidean spatial correlations among the traffic at different sites. A hierarchical, multi-granularity, multi-scale encoder is used to model local periodicities for sites at different time scales, as well as the global interactions between them. The different granularities are integrated in both spatial and temporal dimensions to enhance the site-level traffic volume prediction.

In general, traffic volume prediction can help allocate resources, for example in the example of dispatching taxis or of a bike sharing program. Traffic volume prediction can also be used for intelligent route planning, and mitigating traffic congestion. Additionally, the traffic volume of a region determines crowd volumes in that region, and can thus be used to make related decisions.

Figure 1:
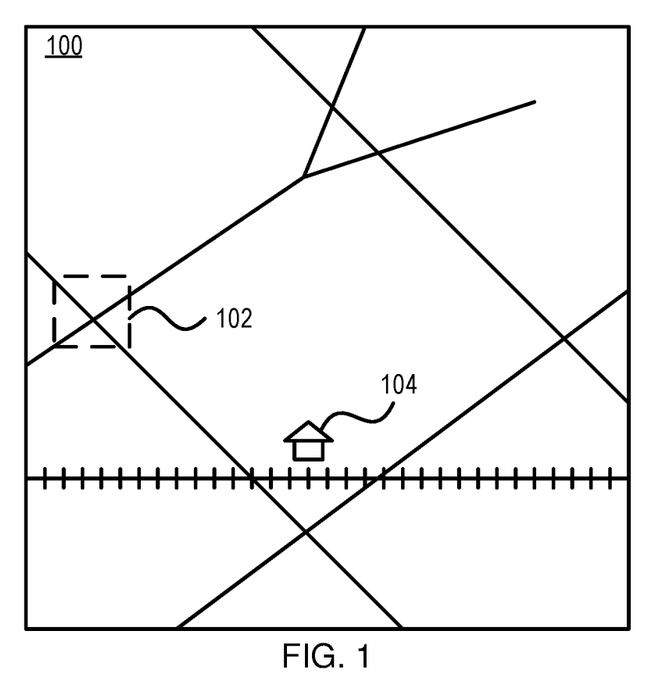
FIG. 1 is a diagram showing a region that includes multiple sites, to illustrate the relationship between site-level traffic and region-level traffic, in accordance with an embodiment of the present invention.

Referring now to FIG. 1, a map of a region 100 is shown. The entirety of the displayed area makes up the region, while two "sites" are shown within it, including an intersection 102 and a train station 104. Traffic into and out of the region 100 may include, for example, vehicular traffic along any of the displayed roads, with vehicles crossing the border to the region 100 continuously. Traffic for the intersection 102 may include, for example, vehicles that pass through that intersection alone, regardless of other traffic nearby. Having information relating about the region-level traffic helps to make predictions regarding the future traffic at individual sites within the region 100.

As used herein, the term "regions" and "site" both refer to a geographic area, with a "region" being a larger geographic area than a "site." As just one example, a "site" may represent a single train station, whereas a "region" may represent a number of neighboring stations. In another example, a "site" may represent a single intersection, whereas a "region" may represent an entire town. In general, the smaller area of "sites," and thus the smaller average number of agents in the site, leads to more volatility in the traffic through the site.

Regions may be determined as, for example, a grid on a map, with each region being of roughly the same geographic area, and with relatively little regard for the contents of each region. Sites, meanwhile, are often more focused on areas of particular interest and may therefore be unevenly distributed. Site-level spatial correlation can be considered to be non-Euclidean and, consequently, cannot be modeled using traditional convolutional networks.

Traffic through the region 100 and the sites 102/104 can furthermore show different local periodicities across different time scales. For example, when predicting the local traffic volume from 10:00 to 10:30 on a particular Friday, then the traffic volume for the same time period on previous Fridays may be strongly correlated. In addition, global correlations can also exist across different time scales. For example, the traffic measured in previous weeks may affect the traffic of previous days, and the traffic measured in previous days may affect the traffic of previous hours. Different granularities of space and time are thus strongly correlated.

As used herein, the term "start traffic volume" is defined as the number of trips that originate in a site or region during a fixed interval of time, and the term "end traffic volume" is defined as the number of trips that terminate in the site or region during a fixed interval of time. Expressed formally, $X_t \in \mathbb{R}^{2*|V|}$ denotes the start and end traffic volumes of $|V|$ sites during the time interval t. It should be understood that traffic volume is thus understood to refer to the traffic in a particular period of time, where trips that "originate in" a site or region during a time interval t may be conducted by the same agent that terminated a trip in the site or region in the time interval t−1. Given the traffic volumes of all of all sites in a region for the past t−1 time intervals, expressed as $X_1, X_2, \ldots, X_{t-1}$, site-level traffic forecasting predicts the traffic $X_t$ of the sites a future time interval t.

As used herein, a time serial is defined as a period of time that is divided into time slots, with gaps between successive time slots. The term "time scale" refers to the length of a time interval between two time slots, while "time granularity" refers to the length of an individual time slot. The term "time slot" is used interchangeably herein with the term "time interval."

Figure 2:
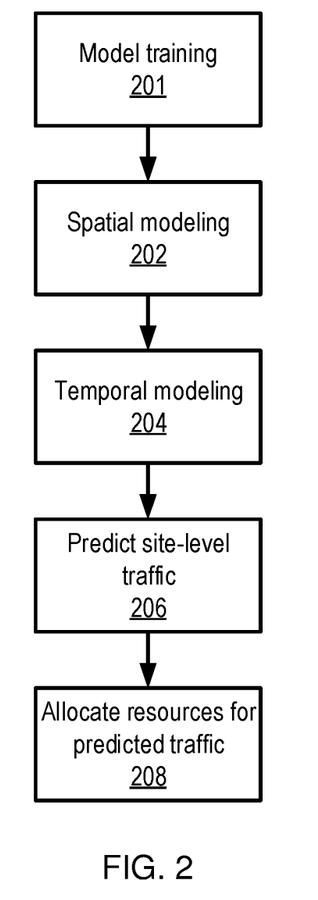
FIG. 2 is a block/flow diagram of a method for predicting and preparing for site-level traffic that is based on both coarse and fine granularity traffic information, across multiple temporal granularities, in accordance with an embodiment of the present invention.

Referring now to FIG. 2, a method for allocating resources in a manner that is responsive to site-level traffic predictions is shown. Block 201 trains a deep, multi-scale, multi-granularity spatial-temporal machine learning model. The model may be implemented as a deep neural network, for example using a mean squared error loss function to train the network by backpropagation.

Block 202 performs spatial modeling using, e.g., a multi-granularity, multi-graph convolutional neural network. Different types of correlations among sites are encoded using multi-graph convolution to enhance site-level spatial correlation learning, with the guidance of coarse-grained spatial correlation. Three graphs can be used to model three types of spatial correlations, including a spatial proximity graph, a transition proximity graph, and a neighborhood graph.

The spatial proximity graph can be expressed as $G_S=(V, A_S)$, where V represents a set of vertices and $A_S \in \mathbb{R}^{|V| \times |V|}$ is an adjacency matrix of weighted edges between the vertices, representing spatial proximity. The transition proximity graph can be expressed as $G_T=(V, A_T)$, where $A_T \in \mathbb{R}^{|V| \times |V|}$ is an adjacency matrix of weighted edges that represents transition similarity of different sites. The neighborhood graph can be expressed as $G_N=(V, A_N)$, where $A_N \in \mathbb{R}^{|V| \times |V|}$ is an adjacency matrix with weighted edges that encode spatial adjacency. The spatial proximity graph and the transition proximity graph can be used to model among site-level spatial correlations, while the neighborhood graph can be used to model region-level spatial correlations.

It should be understood that the terms "spatial proximity" and "spatial adjacency" refer to different concepts, with the spatial proximity representing the closeness of two regions, while spatial adjacency represents the neighborhood of two regions. The proximity graph and the adjacency matrix, meanwhile, represent the same object in two different presentations, one in the form of a graph, the other in the form of a matrix.

Spatially close sites are more likely to have similar traffic volume patterns. Spatial proximity between two sites, i and j, can be defined as the normalized reverse distance between i and j:

$$A_{S,ij} = \frac{e^{-d_{ij}}}{\sum_{ij} e^{-d_{ij}}}$$

where $d_{ij}$ is the physical distance between sites i and j.

Transition proximity depicts the traffic flow patterns among different sites, and can be helpful for traffic volume prediction. Transition proximity can be defined as the normalized transitions between two sites, i and j:

$$A_{T,ij} = \frac{n_{ij}}{\sum_{ij} n_{ij}}$$

where $n_{ij}$ is the observed traffic transitions that start from site i and end at j during the last time periods of length L (e.g., one week).

The neighborhood is used as a simplified spatial proximity for region-level correlations. For each region, the surrounding grids can be considered to be adjacent. Thus:

$$A_{N,ij} = \begin{cases} 1, & \text{region } i \text{ and region } j \text{ are adjacent} \\ 0, & \text{otherwise} \end{cases}$$

A multi-granularity, multi-graph convolutional network (MG-MGCN) can be used to combine fine-grained site correlation with coarse-grained region correlation. Specifically, the map can be split into M×N regions when building site correlation, where M and N determine a two-dimensional grid of regions that is, for example, M regions wide and N regions tall. Then, for each site $s_i$, the region $r_i$ can be retrieved. Spatial correlations of $r_i$ can be used as an extra feature to enhance the correlation learning of $s_i$. The MG-MGCN is then defined as follows:

$$X_{l+1}^s = \sigma\left(\sum_{A \in \mathbb{A}} \hat{D}^{-\frac{1}{2}} \hat{A} \hat{D}^{-\frac{1}{2}} X_l^s W_l^s\right)$$

$$X_{l+1}^r = \sigma\left(\sum_{A \in \mathbb{A}} \hat{D}^{-\frac{1}{2}} \hat{A} \hat{D}^{-\frac{1}{2}} X_l^r W_l^r\right)$$

$$X_{l+1}^{s,r} = \sigma(F(X_{l+1}^s, X_{l+1}^r) W_l^{s,r})$$

where $X_l^s \in \mathbb{R}^{|V_s| \times D_l}$ is the site-level feature vectors of $|V_s|$ sites in layer 1, and $X_l^r \in \mathbb{R}^{|V_r| \times D_l}$ is the region-level feature vectors of $|V_r|$ regions in layer 1. The graph convolutional network may have two layers. The vectors $X_l^{s,r} \in \mathbb{R}^{|V_s| \times D_l}$ denotes the fused multi-granularity feature vectors of $|V_s|$ sites in layer 1. $\mathbb{A}$ represents the set of adjacency matrices, with $A \in \mathbb{A}$ being one of the adjacency matrices. The structure of these vectors follows a graph convolutional operation, where $\hat{A}=A+I$ is the adjacency matrix with self-connections, $\hat{D}$ is the degree matrix of $\hat{A}$. $W_l^s$, $W_l^r \in \mathbb{R}^{D_l \times D_{l+1}}$ and $W_l^{s,r} \in \mathbb{R}^{2D_l \times D_{l+1}}$ are feature transformation matrices, with $D_l$ being the dimension of the $l^{th}$ layer of the graph convolutional network. The graph convolutional network is defined over the networks $G_s$ and $G_r$ and is able to extract feature vectors from neighborhood nodes in the graph. The function F(•) is a fusion function, which first aligns each site vector $x_{i,l}^s \in \mathbb{R}^{D_l}$ in $X_l^s$ to the correct region vector $x_{i,l}^r \in \mathbb{R}^{D_l}$ in $X_l^r$, and then concatenates them to form a combined vector $x_{i,l}^{s,r} \in \mathbb{R}^{2D_l}$.

After K layers of the MG-MGCN, the vectors $X_K^{s,r}$ can be fed to a fully-connected layer to obtain spatial feature vectors of $|V_s|$ sites, $X^{s,r} \in \mathbb{R}^{|V_s| \times D_s}$, which encodes both the fine-grained and coarse-grained multi-graph spatial correlations. Then $X^{s,r}$, at multiple time steps, is used for subsequent temporal modeling. This processing can be done in parallel for spatial correlations at fine granularity (e.g., site-level) and at coarse granularity (e.g., region-level), with separate MG-MGCN networks handling each granularity output.

Block 204 performs temporal modeling, where complex temporal correlations also exist in different time steps. For example, the traffic volume of previous weeks, previous days, and previous hours can all affect the traffic volume of an upcoming time slot. To predict the traffic volume accurately, the correlations between previous time steps are discovered and utilized.

The present embodiments can use a hierarchical, multi-scale, multi-granularity (HMSG) encoder framework, which includes a hierarchical multi-scale encoder and a multi-granularity guidance operator, to perform temporal modeling. This helps account for strong correlations between a target time slot and local periodicities at different time scales, global interactions at different time scales, and different properties being represented at different granularities.

To discover and use both local and global correlations, hidden in the temporal dimension, a local layer and a global layer can be used. The local layer may include, for example, three local encoders, which capture the local periodicities at three different time scales (e.g., week, day, and hour). The global layer can include a global fusion encoder, which captures correlations between different scales of previous time steps.

Each of the three local encoders may use, for example, a long-short term memory (LSTM) architecture. For the global fusion encoder, a transformer encoder can be used to implement a sequence-to-sequence model as a self-attention feedforward network. The LSTM encoders model short-term sequential dependency, while the self-attention feedforward network captures long-distance dependency.

The input sequence to the HMSG encoder can be expressed as $[x_{t-w*l_w}^i, \ldots, x_{t-w*1}^i; x_{t-d*l_d}^i, \ldots, x_{t-d*1}^i; x_{t-h*l_h}^i, \ldots, x_{t-h*l_h}^i]$, where each element is the spatial feature vector of site I at different timestamps. Thus, $x_{t-w*l_w}^i, x_{t-d*l_d}^i, x_{t-h*l_h}^i \in \mathbb{R}^{D_s}$ are the spatial features of the three time scales (e.g., week, day, and hour), w, d, and h are the intervals of the three scales, and $l_w$, $l_d$, and $l_h$ are the lengths of the steps looking back in the three scales. The local layer accepts the input features and performs a transformation at the scale of the week as follows:

$$x_w^i = E_{local}([x_{t-w*l_w}^i, \ldots, x_{t-w*1}^i])$$

Using LSTM as the local encoder produces the output $x_w^i \in \mathbb{R}^{D_{local}}$. The outputs of the other two encoders, $x_d^i$ and $x_h^i$, are determined similarly.

The three local encoders learn the local periodicities at each scale. To model the global interactions among different scales, the outputs of the three local encoders are concatenated and fed into the global fusion encoder to produce:

$$z_i = E_{global}(\text{Cat}(x_w^i, x_d^i, x_h^i))$$

where $z_i \in \mathbb{R}^{3*D_{local}}$ is the output and where $E_{global}$ is a multi-head self-attention feedforward network.

The global fusion encoder includes two layers: The multi-head attention layer and a position-wise feedforward layer. The multi-head attention layer may be defined as:

$$\text{MultiHead}(Q,K,V) = \text{Cat}(\text{head}_1, \ldots, \text{head}_n)$$

$$\text{head}_i = \text{Attention}(QW_i^Q, KW_i^K, VW_i^V)$$

where Q, K, and V are query, key, and value vectors, respectively, and $W_i^Q$, $W_i^K$, and $W_i^V$ are learnable parameters of linear transformation matrices. The attention function can be implemented as a scalar dot-product intention, for example as:

$$\text{Attention}(Q, K, V) = \text{softmax}\left(\frac{QK^T}{\sqrt{d_k}}\right)V$$

where $d_k = D_{local}/h$ is the dimension of local features, divided by the number of heads. In some embodiments, the vectors may be set as the concatenated features from local encoders Q, K, V=$Y^i$=Cat($Y_w^i$, $Y_d^i$, $Y_h^i$)$\in \mathbb{R}^{3*d_{local}}$.

The output of the multi-head attention layer can be used as input to a position-wise feedforward layer:

$$\text{FFN}(X) = \text{ReLU}(XW_1+b_1)+b_2$$

where ReLU is a rectified linear unit, and $b_1$ and $b_2$ are bias parameters that can be learned during training. Each layer of $E_{global}$ may also be immediately followed by residual connection and layer normalization.

Other residual connections from the output of $E_{local}$ to $E_{global}$ can also be used to facilitate training of deeper models and to keep local features. The actual output of the global encoder can therefore be:

$$z_i = E_{global}(\text{Cat}(x_w^i, x_d^i, x_h^i)) + \text{Cat}(x_w^i, x_d^i, x_h^i)$$

Because fine-grained temporal modeling is more susceptible to noise, a multi-granularity guidance operator (MGGO) can be used to combine the different temporal granularity outputs and to improve the accuracy of fine-granularity predictions, using the guidance of coarse-granularity predictions. The MGGO can then be defined as:

$$\text{MGGO}(x^i, x'^i) = \sigma(\text{CAT}(x^i, x'^i)W_m + b_m)$$

where $x^i = \text{Cat}(x_w^i, x_d^i, x_h^i)$ represents the concatenated features, taken at a granularity that matches the target time slot, where $x'^i = \text{Cat}(x'^i_w, x'^i_d, x'^i_h)$ represents the concatenated coarse features, where $\sigma$ is the sigmoid activation function, and where $W_m$ and $b_m$ are parameters of a linear transformation. The output of $E_{global}$ can then be expressed as:

$$z_i = E_{global}(\text{MGGO}(x^i, x'^i)) + \text{MGGO}(x^i, x'^i)$$

This output can be fed into a fully connected layer to obtain the final prediction:

$$\hat{y}^i = \sigma(W_f z_i + b_f)$$

where $W_f$ and $b_f$ are parameters. All input volumes can be normalized to [0.1], and the output scale of the model can also be [0,1], to be denormalized when needed.

One the site-level traffic predictions $\hat{y}^i$ have been obtained by block 206, block 208 can use these predictions to allocate resources. Considering, for example, a municipal bike-sharing program, a prediction which shows high volumes of traffic through a particular site can prompt the allocation of additional bicycles to that site.

In another exemplary embodiment, the traffic flow prediction model can be used to model computer network traffic. In this manner, additional network resources (e.g., bandwidth, routing hardware, etc.) can be deployed in response to increases in predicted network traffic at particular sites.

The present embodiments provide substantially improved predictions, as compared to baseline predictive models, which only consider single, non-Euclidean correlations among sites. In contrast, the present embodiments encode multiple spatial correlations, by aggregating graph convolutions on multiple graphs, and furthermore combine different spatial granularities, which provide complementary volume patterns.

Figure 3:
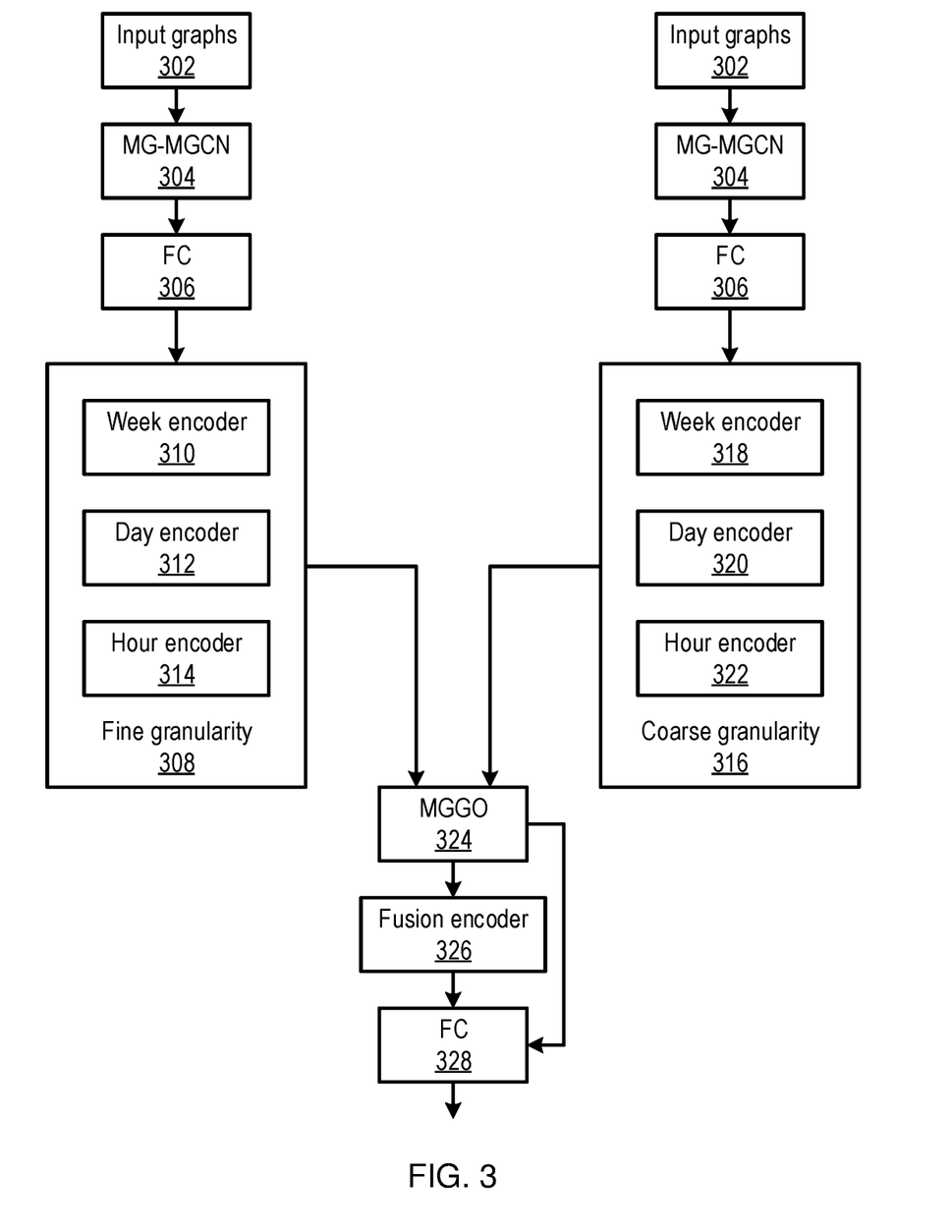
FIG. 3 is a block diagram of a neural-network-based traffic flow prediction model that accounts for multiple spatial granularities and multiple temporal granularities, in accordance with an embodiment of the present invention.

Referring now to FIG. 3, a detailed view of an exemplary deep, multi-scale, multi-granularity spatial-temporal machine learning model is shown. The input graphs include information that is collected at both the site-scale and at the region-scale. As noted above, these graphs are used for spatial modeling in block 202. MG-MGCN 304 combines the fine-grained site correlation information with coarse-grained region correlations, and a fully connected layer 306 can be used to obtain spatial feature vectors for the sites. It should be understood that different MG-MGCN networks 304 can be used for fine-grained features and for coarse-grained features, before the outputs are fed to respective fine spatial-granularity temporal processing block 308 and coarse spatial-granularity temporal processing block 316.

The spatial feature vectors are used as inputs to a fine granularity network 308, dealing with site-level features, and a coarse granularity network 316, dealing with region-level features, for example as part of the temporal modeling of block 204. The fine granularity network 308 may include week encoder 310, day encoder 312, and hour encoder 314, though it should be understood that any appropriate granularities may be used instead. Each encoder in the fine granularity network 308 outputs a respective feature vector at a respective granularity (e.g., $x_w^i$, $x_d^i$, and $x_h^i$).

Similarly, the coarse granularity network 316 may include week encoder 318, day encoder 320, and hour encoder 322, though it should be understood that any appropriate granularities may be used instead. Each encoder in the coarse granularity network 316 outputs a respective feature vector at a respective granularity (e.g., $x'^i_w$, $x'^i_d$, and $x'^i_h$).

The feature vectors output by the fine granularity network 308 and the coarse granularity network 316 are used as input to MGGO 324, which combines the different temporal granularity outputs. A global fusion encoder 326 implements multi-scale attention to identify encoded, multi-granularity, multi-scale features $z_i$. The output of the fusion encoder 326, and the output of the MGGO 324, are combined and fed to a fully connected layer 328, to provide site-level traffic predictions at block 206.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), field-programmable gate arrays (FPGAs), and/or programmable logic arrays (PLAs).

These and other variations of a hardware processor subsystem are also contemplated in accordance with embodiments of the present invention.

Figure 4:
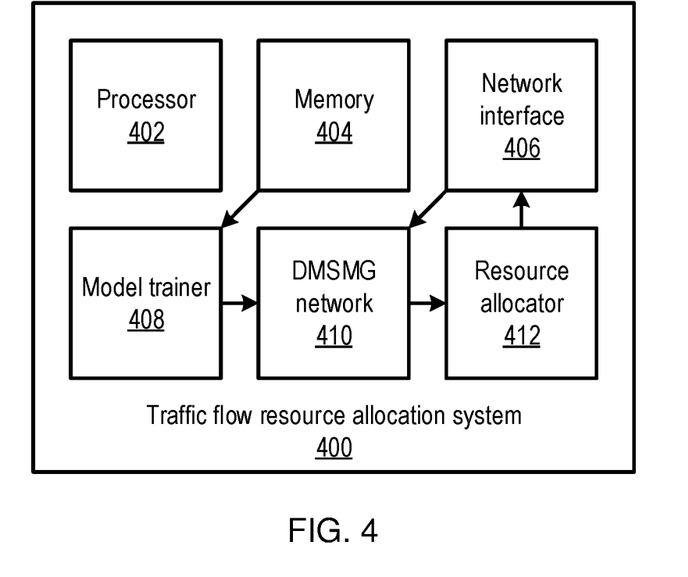
FIG. 4 is a block diagram of a traffic flow resource allocation system that predicts site-level traffic flow based on multiple spatial and temporal granularities, in accordance with an embodiment of the present invention.

Referring now to FIG. 4, a traffic flow resource allocation system 400 is shown. The system 400 includes a hardware processor 402 and a memory 404. A network interface 406 communicates with other systems, for example to collect up-to-date observations of traffic at particular sites and regions. The network interface 406 can use any appropriate wired or wireless communication medium and protocol.

A deep, multi-scale, multi-granularity spatial-temporal machine learning model 410 is trained by model trainer 408. The model 410 can be implemented as one or more neural networks, as described in greater detail below. The trained model 410 accepts the latest traffic flow information from the network interface 406 and generates site-level predictions for traffic flow. A resource allocator 412 then uses the site-level traffic flow predictions to allocate resources, such as computing resources or physical resources, to accommodate the predicted traffic.

An artificial neural network (ANN) is an information processing system that is inspired by biological nervous systems, such as the brain. The key element of ANNs is the structure of the information processing system, which includes a large number of highly interconnected processing elements (called "neurons") working in parallel to solve specific problems. ANNs are furthermore trained in-use, with learning that involves adjustments to weights that exist between the neurons. An ANN is configured for a specific application, such as pattern recognition or data classification, through such a learning process.

Figure 5:
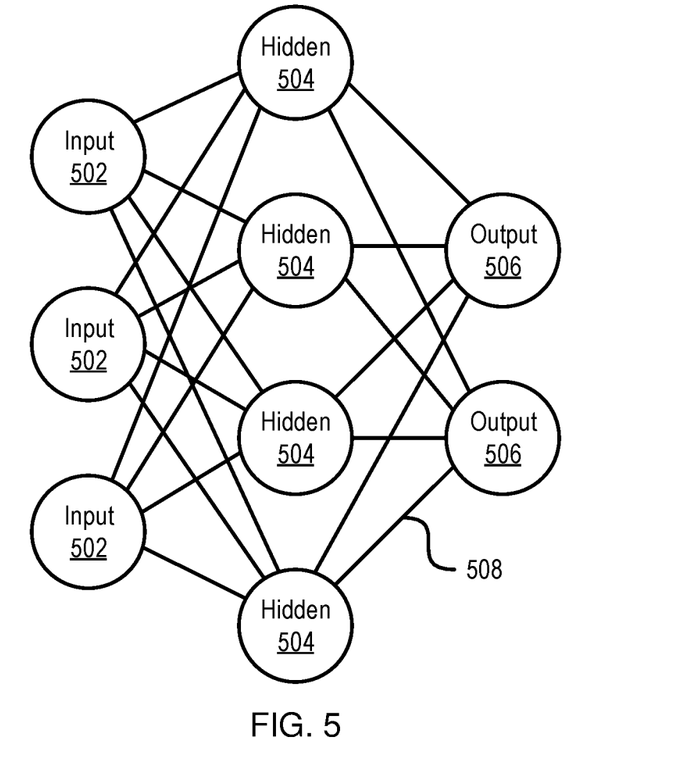
FIG. 5 is a diagram of an exemplary neural network architecture in accordance with an embodiment of the present invention.

Referring now to FIG. 5, a generalized diagram of a neural network is shown. ANNs demonstrate an ability to derive meaning from complicated or imprecise data and can be used to extract patterns and detect trends that are too complex to be detected by humans or other computer-based systems. The structure of a neural network is known generally to have input neurons 502 that provide information to one or more "hidden" neurons 504. Connections 508 between the input neurons 502 and hidden neurons 504 are weighted and these weighted inputs are then processed by the hidden neurons 504 according to some function in the hidden neurons 504, with weighted connections 508 between the layers. There may be any number of layers of hidden neurons 504, and as well as neurons that perform different functions. There exist different neural network structures as well, such as convolutional neural network, maxout network, etc. Finally, a set of output neurons 506 accepts and processes weighted input from the last set of hidden neurons 504.

This represents a "feed-forward" computation, where information propagates from input neurons 502 to the output neurons 506. Upon completion of a feed-forward computation, the output is compared to a desired output available from training data. The error relative to the training data is then processed in "feed-back" computation, where the hidden neurons 504 and input neurons 502 receive information regarding the error propagating backward from the output neurons 506. Once the backward error propagation has been completed, weight updates are performed, with the weighted connections 508 being updated to account for the received error. This represents just one variety of ANN.

Figure 6:
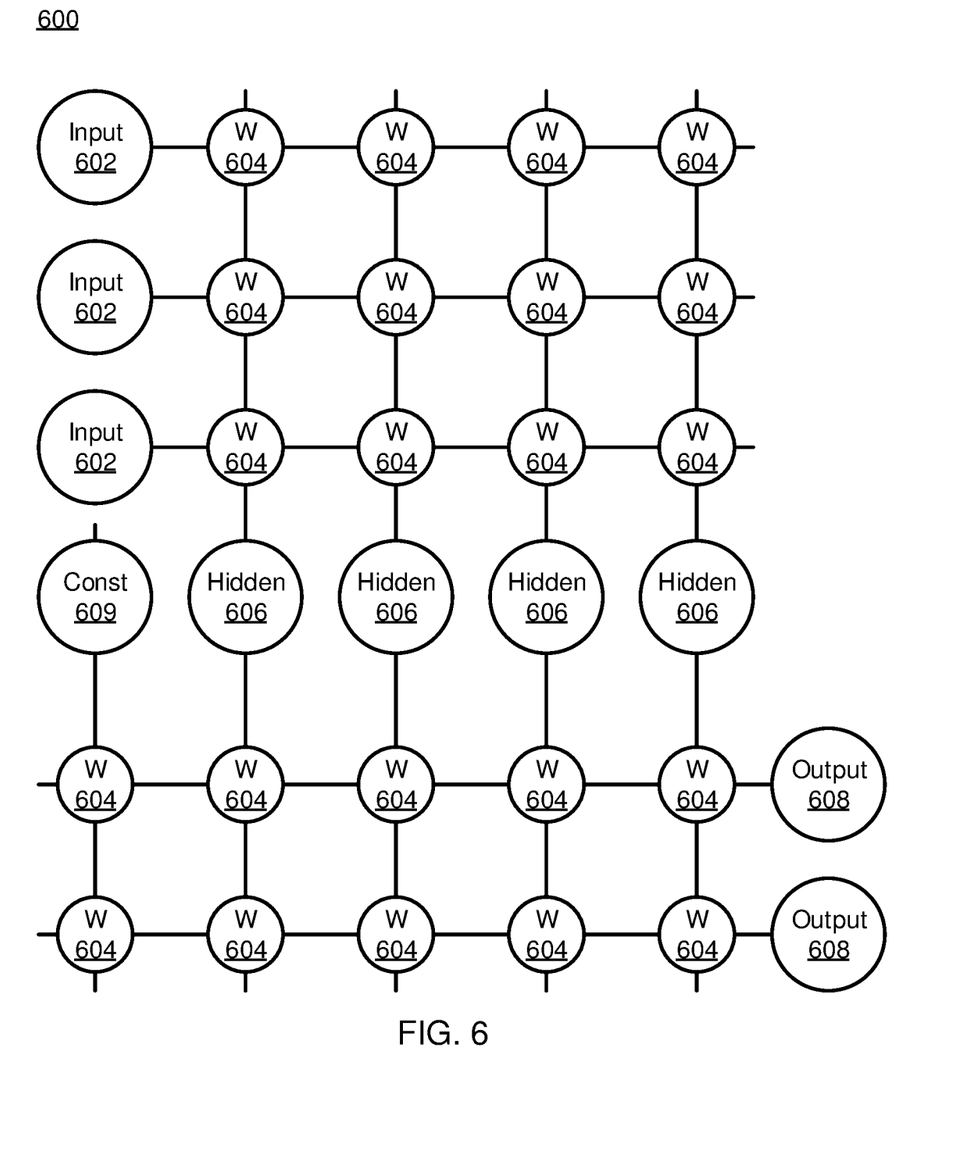
FIG. 6 is a diagram of an exemplary neural network architecture, with discrete weights, in accordance with an embodiment of the present invention.

Referring now to the drawings in which like numerals represent the same or similar elements and initially to FIG. 6, an ANN architecture 600 is shown. It should be understood that the present architecture is purely exemplary and that other architectures or types of neural network may be used instead. The ANN embodiment described herein is included with the intent of illustrating general principles of neural network computation at a high level of generality and should not be construed as limiting in any way.

Furthermore, the layers of neurons described below and the weights connecting them are described in a general manner and can be replaced by any type of neural network layers with any appropriate degree or type of interconnectivity. For example, layers can include convolutional layers, pooling layers, fully connected layers, softmax layers, or any other appropriate type of neural network layer. Furthermore, layers can be added or removed as needed and the weights can be omitted for more complicated forms of interconnection.

During feed-forward operation, a set of input neurons 602 each provide an input signal in parallel to a respective row of weights 604. The weights 604 each have a respective settable value, such that a weight output passes from the weight 604 to a respective hidden neuron 606 to represent the weighted input to the hidden neuron 606. In software embodiments, the weights 604 may simply be represented as coefficient values that are multiplied against the relevant signals. The signals from each weight adds column-wise and flows to a hidden neuron 606.

The hidden neurons 606 use the signals from the array of weights 604 to perform some calculation. The hidden neurons 606 then output a signal of their own to another array of weights 604. This array performs in the same way, with a column of weights 604 receiving a signal from their respective hidden neuron 606 to produce a weighted signal output that adds row-wise and is provided to the output neuron 608.

It should be understood that any number of these stages may be implemented, by interposing additional layers of arrays and hidden neurons 606. It should also be noted that some neurons may be constant neurons 609, which provide a constant output to the array. The constant neurons 609 can be present among the input neurons 602 and/or hidden neurons 606 and are only used during feed-forward operation.

During back propagation, the output neurons 608 provide a signal back across the array of weights 604. The output layer compares the generated network response to training data and computes an error. The error signal can be made proportional to the error value. In this example, a row of weights 604 receives a signal from a respective output neuron 608 in parallel and produces an output which adds column-wise to provide an input to hidden neurons 606. The hidden neurons 606 combine the weighted feedback signal with a derivative of its feed-forward calculation and stores an error value before outputting a feedback signal to its respective column of weights 604. This back propagation travels through the entire network 600 until all hidden neurons 606 and the input neurons 602 have stored an error value.

During weight updates, the stored error values are used to update the settable values of the weights 604. In this manner the weights 604 can be trained to adapt the neural network 600 to errors in its processing. It should be noted that the three modes of operation, feed forward, back propagation, and weight update, do not overlap with one another.

Figure 7:
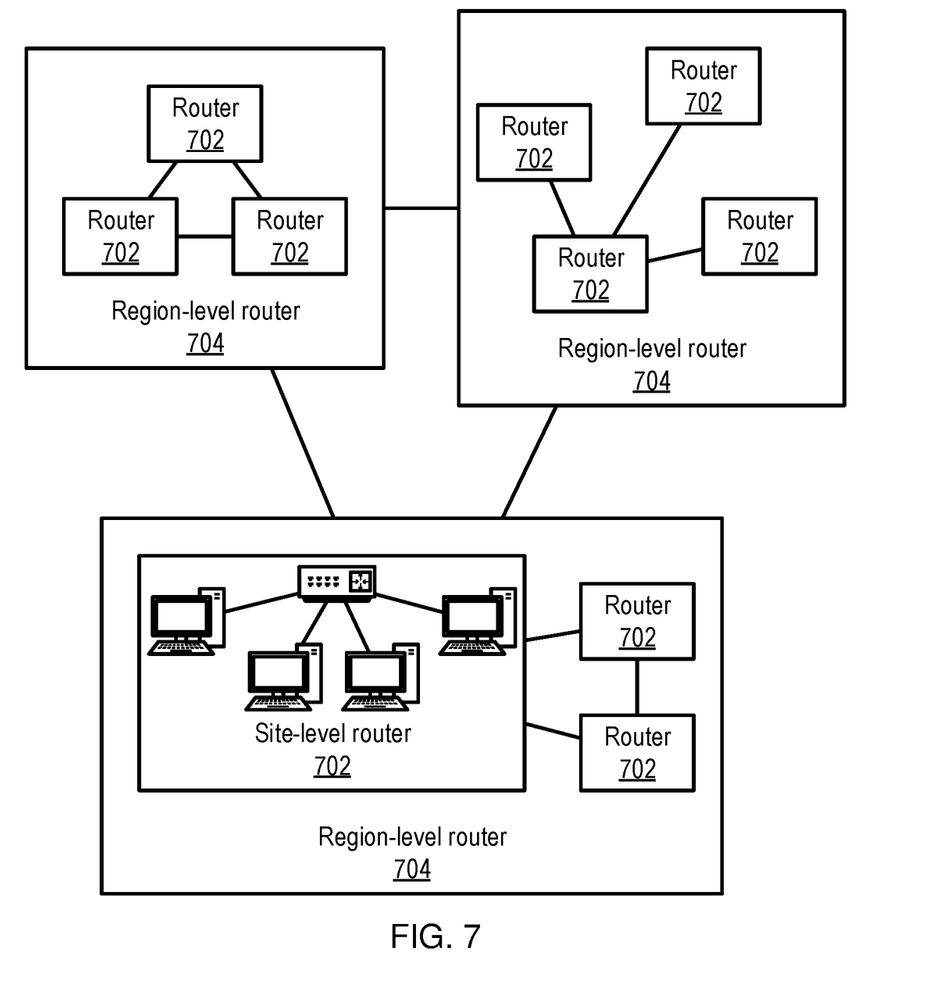
FIG. 7 is a diagram of a computer network having varying site-level and region-level traffic flow information, in accordance with an embodiment of the present invention.

Referring now to FIG. 7, a computer network is shown having multiple site-level routers 702 and region-level routers 704. The site-level routers 702 handle local traffic, for example in a local area network. In one exemplary embodiment, multiple such site-level routers 702 could exist within a single building, and could, together, belong to a single region. A corresponding region-level router 704 would then manage traffic that passes between that building and another building, representing a distinct region, with its own respective region-level router 704 and site-level routers 702.

Following the present embodiments, traffic through the site-level routers 702 can be understood as traffic passing from one networked computer to another, within that local area network, while traffic through the region-level routers 704 could be understood as traffic passing from one region to another within a larger corporate wide area network, or from one service provider to another within the internet.

When a high degree of site-level traffic is predicted for a site-level router 702, additional networking resources can be provisioned to help handle the increased traffic. For example, if a particular site-level router 702 serves a webserver, and increased traffic to that webserver is predicted, then additional webserver instances can be provided, additional bandwidth can be allocated, and/or traffic can be partially or wholly routed to another to another site. In this manner, site-level traffic fluctuations can be predicted and addressed in an automatic fashion.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for allocating network resources responsive to network traffic, comprising:
    modeling spatial correlations between fine spatial granularity traffic and coarse spatial granularity traffic for a plurality of different sites and regions to determine spatial feature vectors for one or more sites in a network, using a processor-implemented neural network;
    modeling temporal correlations at a fine spatial granularity across multiple temporal scales, based on the spatial feature vectors;
    modeling temporal correlations at a coarse spatial granularity across multiple temporal scales, based on the spatial feature vectors;
    determining a traffic flow prediction for the one or more sites in the network, based on the temporal correlations at the fine spatial granularity and the temporal correlations at the coarse spatial granularity; and
    provisioning network resources at the one or more sites in accordance with the traffic flow prediction.

2. The method of claim 1, wherein modeling the spatial correlations includes determining historical traffic flow information using a site-level graph and a region-level grid.

3. The method of claim 2, wherein each site in the site-level graph represents a particular device and each region in the region-level grid reflects multiple devices.

4. The method of claim 1, wherein modeling the spatial correlations includes:
   determining region-level spatial correlations; and
   determining site-level spatial correlations based on the region-level spatial correlations.

5. The method of claim 1, wherein modeling spatial correlations includes outputting fine spatial granularity spatial feature vectors and coarse spatial granularity spatial feature vectors.

6. The method of claim 5, wherein modeling temporal correlations at the fine spatial granularity uses the fine spatial feature vectors and modeling temporal correlations at the coarse spatial granularity uses the coarse spatial feature vectors.

7. The method of claim 1, wherein modeling temporal correlations at each of the fine spatial granularity and the coarse spatial granularity comprises encoding the spatial feature vectors at multiple different temporal scales.

8. The method of claim 7, wherein encoding the spatial vectors at multiple different temporal scales includes encoding the spatial vectors at scales that include one week, one day, and one hour.

9. The method of claim 1, further comprising combining the temporal correlations at the fine temporal granularity and the temporal correlations at the coarse temporal granularity, wherein determining the traffic flow prediction is based on the combined temporal correlations.

10. A method for allocating resources responsive to site-level traffic, comprising:
   modeling spatial correlations between fine spatial granularity traffic and coarse spatial granularity traffic for a plurality of different sites and regions to determine spatial feature vectors for one or more sites, using a processor-implemented neural network;
   modeling temporal correlations at a fine spatial granularity across multiple temporal scales, based on the spatial feature vectors;
   modeling temporal correlations at a coarse spatial granularity across multiple temporal scales, based on the spatial feature vectors;
   determining a traffic flow prediction for the one or more sites in the network, based on the temporal correlations at the fine spatial granularity and the temporal correlations at the coarse spatial granularity; and
   providing resources at the one or more sites in accordance with the traffic flow prediction.

* * * * *